(12) United States Patent
Velton

(10) Patent No.: US 8,590,916 B2
(45) Date of Patent: Nov. 26, 2013

(54) SYSTEM AND METHOD FOR AUTOMATICALLY CONNECTING A WATERCRAFT TO A TRAILER

(71) Applicant: Paul Velton, Lakeside, CA (US)

(72) Inventor: Paul Velton, Lakeside, CA (US)

( * ) Notice: Subject to any disclaimer, the term of this patent is extended or adjusted under 35 U.S.C. 154(b) by 0 days.

(21) Appl. No.: 13/713,868

(22) Filed: Dec. 13, 2012

(65) Prior Publication Data

US 2013/0147156 A1 Jun. 13, 2013

Related U.S. Application Data

(60) Provisional application No. 61/570,244, filed on Dec. 13, 2011.

(51) Int. Cl.
*B60P 3/10* (2006.01)

(52) U.S. Cl.
USPC ............ 280/414.1; 410/77; 410/69; 410/90; 114/44

(58) Field of Classification Search
USPC ................ 280/414.1; 410/77, 69, 80; 114/44
See application file for complete search history.

(56) References Cited

U.S. PATENT DOCUMENTS

| | | |
|---|---|---|
| 2,763,384 A | 9/1956 | Foster |
| 3,038,829 A | 2/1976 | Anderson |
| 3,989,267 A | 11/1976 | Robinson |
| 4,114,920 A | 9/1978 | Boettcher |
| 4,641,851 A | 2/1987 | Knies |
| 4,684,145 A | 8/1987 | Tingley |
| 4,919,446 A | 4/1990 | Higgins |
| 4,995,629 A | 2/1991 | Poppell |
| 5,013,206 A | 5/1991 | Ernst et al. |
| 5,114,168 A | 5/1992 | Kehl |
| 5,120,079 A * | 6/1992 | Boggs ................... 280/414.1 |
| 5,165,706 A * | 11/1992 | Fond .................... 280/414.1 |
| 5,172,928 A | 12/1992 | Capps |
| 5,666,901 A | 9/1997 | Jones |
| 5,683,214 A * | 11/1997 | Jeffreys ..................... 410/77 |
| 5,876,166 A | 3/1999 | Hyslop |
| 5,879,114 A | 3/1999 | Spence |
| 6,923,138 B2 | 8/2005 | Holbrook |
| 7,237,788 B1 * | 7/2007 | Norbits ................... 280/414.1 |
| 7,455,310 B2 * | 11/2008 | Hyslop ................... 280/414.1 |
| 2009/0066058 A1 | 3/2009 | Comried, Jr. |

\* cited by examiner

*Primary Examiner* — Tashiana Adams
*Assistant Examiner* — Marlon Arce
(74) *Attorney, Agent, or Firm* — Timothy M. Brown, Esq.

(57) ABSTRACT

The present invention relates to systems and methods for automatically connecting a watercraft to a trailer. The invention permits a watercraft to be connected to a submerged trailer so that the watercraft can be withdrawn from a body of water by a single operator. The systems and methods of the invention incorporate a bow target guide which guides the operator of a watercraft to a catch mechanism so that a connection between the trailer and watercraft can be made automatically. The systems of the invention may be provided as a kit for modifying an existing trailer, or they may form an integral component of a trailer. Methods of making and using the present system are within the scope of the invention.

20 Claims, 6 Drawing Sheets

SYSTEM AND METHOD FOR AUTOMATICALLY CONNECTING A WATERCRAFT TO A TRAILER

CROSS-REFERENCE TO RELATED APPLICATIONS

This application claims priority to provisional application Ser. No. 61/570,244 filed on Dec. 13, 2011, the entire contents of which are incorporated herein by reference in their entirety.

BACKGROUND

The invention generally relates to trailers for hauling and launching watercraft. More particularly, the invention relates to a system for automatically connecting a watercraft to a trailer and includes methods for making, assembling and using the inventive system.

The invention improves known watercraft trailers by making it easier to connect a floating watercraft to a trailer no that the watercraft can be removed from the water quickly and efficiently. Trailers tacking the system of the invention are difficult to align with a watercraft because the features of the trailer that contact and support the watercraft are difficult to see since they are often submerged and may be underneath the watercraft during loading. Thus, using a trailer to remove a watercraft from a body of water often requires the cooperation of at least two people wherein one person operates the watercraft under the guidance of a second person who then secures the watercraft to the trailer after the watercraft and trailer are aligned. The need for two people to secure a watercraft to a trailer can therefore discourage a single person from launching and enjoying the use of a watercraft. Moreover, the cooperation of two people is not flawless since it often requires several attempts to get a watercraft and trailer property aligned. and connected to the trailer.

What is needed in the art therefore is a system for simplifying the connecting of a watercraft to a trailer so that one person can launch and remove a watercraft from a body of water quickly and efficiently.

SUMMARY OF THE INVENTION

The present invention improves known watercraft trailers by providing a system that allows a single person to navigate a watercraft onto a trailer so that the watercraft can be connected to the trailer automatically. It is therefore an object of the invention to provide the described system as a kit comprising one or more components that may be assembled onto an existing trailer. It is a further object of the invention to provide a trailer that comprises the system of the invention. Methods of making and using the system to automatically connect a watercraft to a trailer are further objects of the invention,

SPECIFICATION

Figure 1:
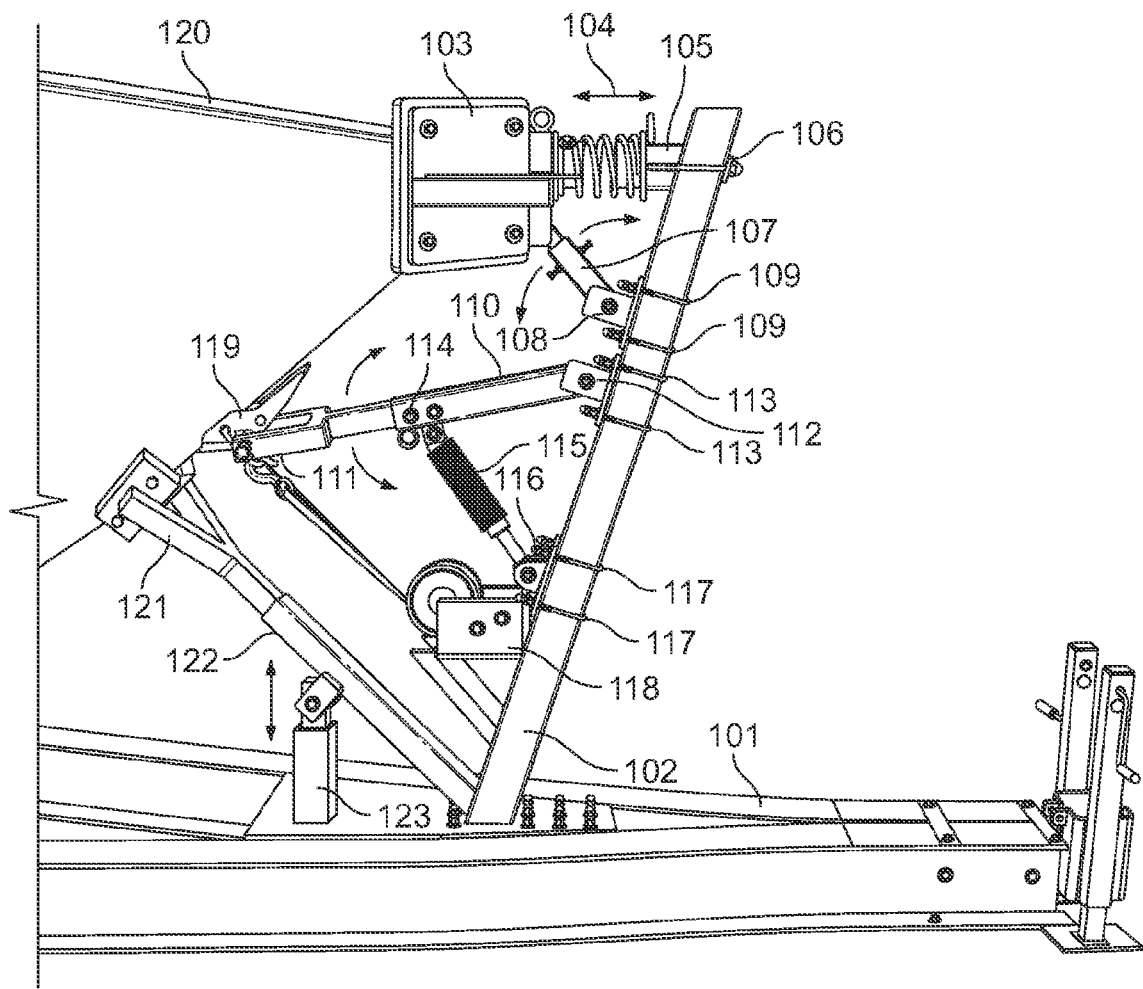
FIG. 1 is a side view of the forward portion of a trailer that incorporates a system according to the invention.

FIG. 1 depicts the forward portion of a watercraft trailer that incorporates a system according to the invention wherein frame (101) is connected to bow support (102). Connected to bow support (102) is mount (105) which holds load compression member (104) in place. Connected to the opposing end of load compression member (104) is bow target (103). Mount (105) is connected to bow support (102) by connection (106) which may comprise any suitable connection, such as bolts, welds, or a combination thereof, for example. In the embodiment depicted in FIG. 1, connection (106) comprises a lag bolt, while load compression member (104) comprises a coiled spring. Connected to the tower end of bow target (103) is bow target guide (107)which pivotably connects to bow target (103) on its upper end, and pivotably connects to mount (108) on its lower end. Bow target guide (107) is preferably adjustable in length. In the embodiment depicted in FIG. 1, bow target guide (107) comprises two portions connected in a sliding sleeve arrangement. Mount (108) is connected to bow support (102) by connection (109). As with other connections in the invention, connection (109) may assume the form of u-bolts, welds or a combination thereof, for example.

Latch arm (110) is positioned below bow target (103) and comprises catch mechanism (111) at a distance from bow support (102). Latch arm (110) is pivotably connected to bow support (102) by mount (112) which is connected to bow support (102) by connection (113). Latch arm (110) may be adjustable in length so as to increase or decrease the distance of catch mechanism (111) from bow support (102). In the embodiment depicted in FIG. 1, latch arm (110) comprises two portions which are slidably connected in a sleeve arrangement, the portions being secured in place by tension bolts (114). Tension bolts (114) may alternatively comprise bolts which traverse the interlocking sleeve portions of latch arm (110) through a series of holes in the sleeves which allow the length of latch arm (110) to be adjusted. Latch arm (110) is pivotably connected to the upper end of load compression member (115). The lower end of load compression member (115) is pivotably connected to mount (116) which is connected to bow support (102) by connection (117). In the embodiment depicted in FIG. 1, load compression member (115) comprises a shock, while connection (117) comprises a pair of u-shaped lag bolts. It should be noted that load compression member (115) is optionally adjustable in length, such as by a threaded shaft. Load compression member (115) may assume any form that produces resistance when latch arm (110) is drawn towards frame (101) (i.e. compressed) by either winch (118) or the advancement of keel hook (119) against catch mechanism (111) during the connection process. Compression member (115) may comprise one or more shocks (e.g. pneumatic or hydraulic shocks), springs (e.g. coil or leaf springs), resilient members, or a combination thereof.

Still referring to FIG. 1, the system of the invention optionally comprises winch (118) connectable to bow support (102), such as by a mount. Winch (118) may comprise a strap and hook that can connect to keel hook (119) for drawing watercraft (120) towards latch arm (110) during the docking of a watercraft onto the trailer. Winch (118) may also connect to catch mechanism (111), such as by loop (302), so that latch arm (110) may be drawn downwards towards frame (101) thereby compressing load compression member (115). FIG. 1 further depicts optional keel stabilizer (122) which comprises keel mount (121) which is configured to accept the keel of watercraft (120). Keel stabilizer (122) is connected to bow support (102) by a pivoting connecting means (not shown), Keel stabilizer (122) is pivotably connected to keel stabilizer support (123). Both keel stabilizer (122) and keel stabilizer support (123) may be adjustable length such as by a sleeve arrangement as depicted in FIG. 1. Keel stabilizer (123) is firmly fixed to frame (101), such as by welding, bolting or a combination thereof.

Figure 2:
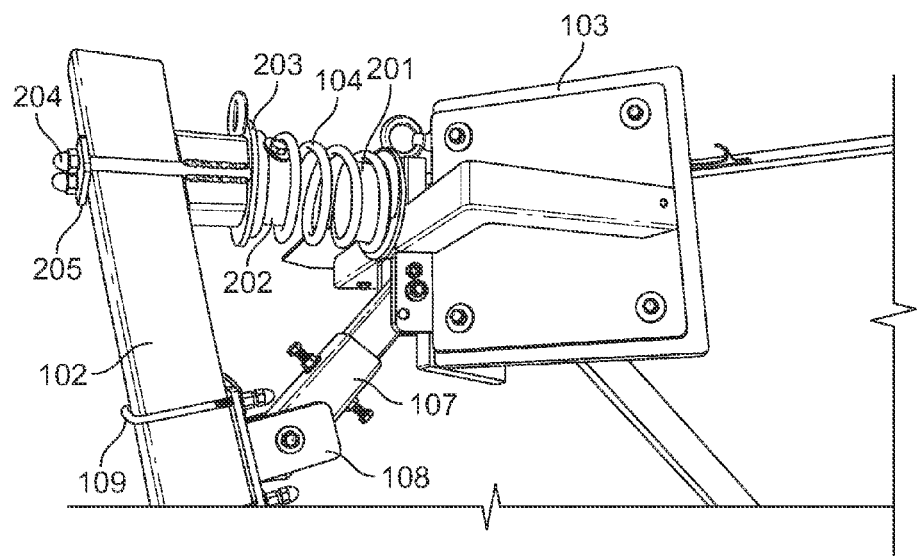
FIG. 2 is a perspective view of the bow target assembly of the inventive system.

FIG. 2 depicts bow target assembly comprising bow target (103) connected to load compression member (104) by mount (201). Load compression member (104) connects to mount (202) opposite bow target (103). Mounts (201) and (202) may assume any form that connects load compression member (104) to bow target (103) in a manner that permits load compression member (104) to compress and provide the resistance necessary to keep watercraft (120) in a latched position when latch arm (110) and catch mechanism (111) engage keel hook (119) as disclosed herein. In the embodiment depicted in FIG. 2, mounts (201) and (202) comprise opposing tubular bodies (e.g. pipe sections) that fit within load compression member (104), Mounts (201) and (202) are firmly fixed (i.e. connected) to load compression member (104), such as by bolts or welding. In the embodiment depicted in FIG. 2, mount (202) connects to bow support (102) by abutment plate (203) and a pair of cooperating lag bolts (204) which fix mount (202) against bow support (102) by strap (205). Load compression member (104) can assume any suitable component or arrangement of components such as one or more shocks (e.g. pneumatic or hydraulic shocks), springs, resilient members, or a combination thereof.

In the embodiment depicted in FIG. 2, bow target (103) comprises two vertically arranged planar pieces which are arranged in a v-shape for accepting the bow of a watercraft (e.g. a boat), Bow target guide (107) and its associated mount are an optional feature of the present system. When bow target guide (107) is incorporated in the system, bow target guide (107) is pivotably connected to bow target (103) on its upper end, and pivotably connected to mount (108) on its lower end. Mount (108) is connected to bow support (102) by connection (109). In the embodiment depicted in FIG. 2, connection (109) comprises a pair of u-shaped lag bolts (though only the upper u-shaped lag bolt is depicted), Connection (109) may similarly assume a form wherein mount (108) is welded to bow support (102) or connected to bow support (102) through a hole and bolt arrangement.

In some aspects of the invention, bow target (103) serves as a guiding mechanism for directing a watercraft onto a trailer. Mounting bow target (103) at or near the top of bow support (102) permits the bow target (103) to be visible to an operator of watercraft (120) thereby allowing the operator to determine if watercraft (120) is being property aligned with the trailer. Thus, it is often desirable to provide the trailer with a bow support (102) that is sufficient in length to be at the same height as the bow of watercraft (120) when a trailer having the system of the invention is submerged in a body of water and positioned to receive a watercraft. In addition, bow target (103) may be shaped to guide the bow of watercraft (120) towards the center of the trailer. For example, in the embodiments depicted in the figures, bow target (103) assumes a v-shape which can direct a pointed bow of a watercraft to the center of the trailer.

Figure 3:
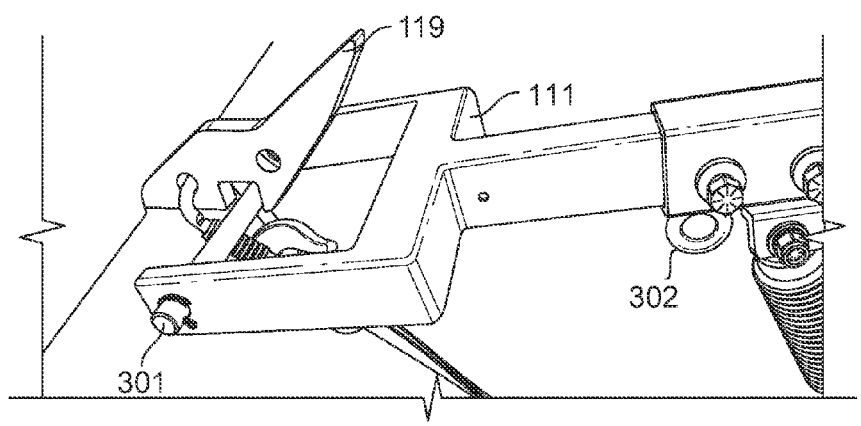
FIG. 3 is a perspective view of a keel hook and catch mechanism in cooperation with one another.
Figure 4:
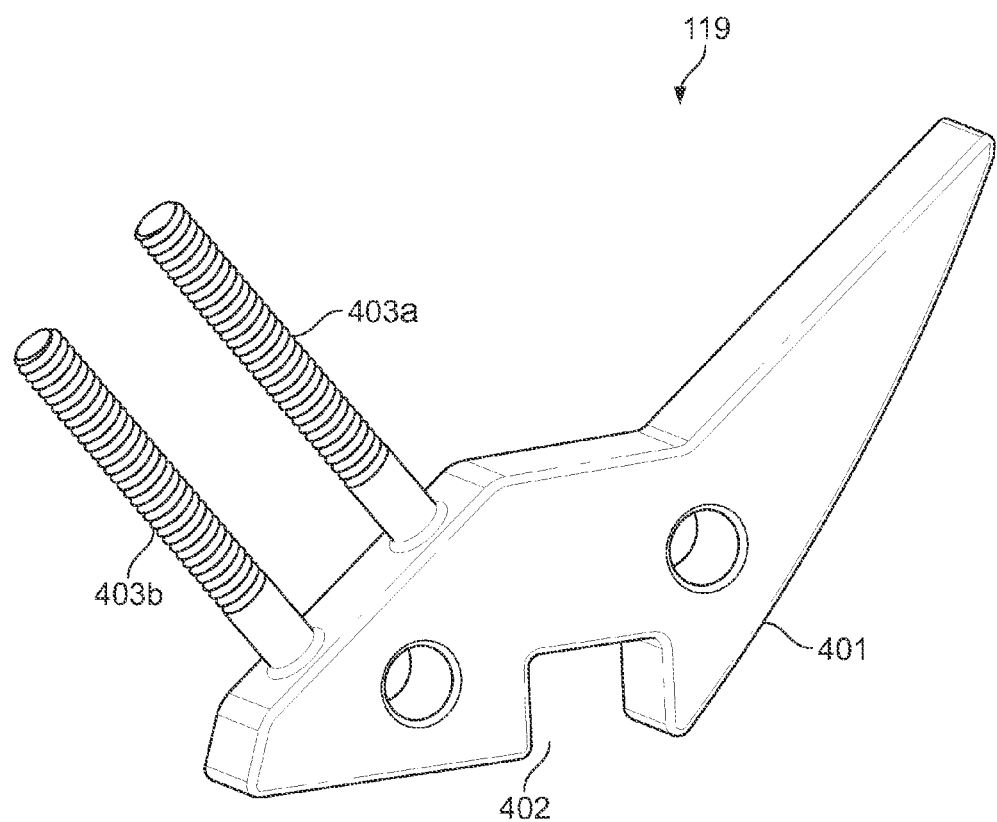
FIG. 4 depicts a keel hook according to an embodiment of the invention.

FIG. 3 depicts keel hook (119) connected to the hull of watercraft (120) with catch mechanism (111) cooperating with keel hook (119). In the depicted embodiment, catch mechanism (111) comprises cross-member (301) which is configured to occupy notch (402) on keel hook (119). Connecting loop (302) is fixed to latch arm (110) in a manner, such as by welding, to permit winch (118) to connect to latch arm (110). As depicted in FIG. 4, keel hook (119) comprises edge (401) which is configured to ride against cross-member (301) until cross-member (301) engages notch (402) during the loading procedure disclosed herein. Keel hook (119) comprises a pair of hull bolts (403a-b) for connecting keel hook (119) to the hull of a watercraft.

Figure 5:
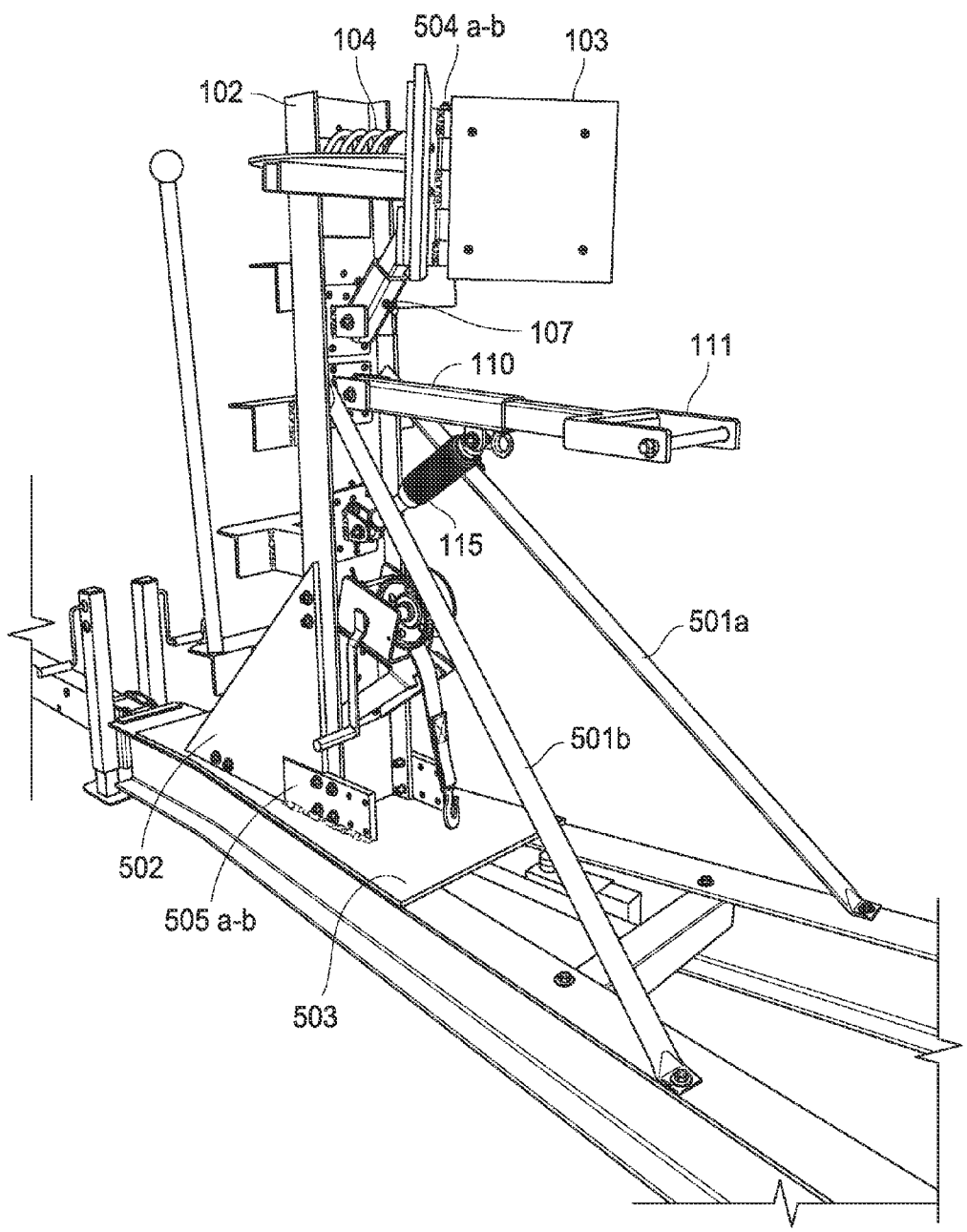
FIG. 5 is a rear perspective view of a trailer that incorporates a system according to an embodiment of the invention wherein the bow support is at a 90° angle with respect to the frame of a trailer.

FIG. 5 depicts the forward portion of a trailer equipped with a system according to the invention wherein bow support (102) is arranged at an angle that is substantially 90° with respect to frame (101). According to the trailer of FIG. 5, bow mount (121), bow stabilizer (122) and stabilizer support (123) do not form part of the system. Bow support (102) is braced by a pair of reinforcing members (501a-b) and by a pair of vertically arranged opposing planar menibers (502) which are connected to frame (101) such as by bolts or welding. In the embodiment depicted in FIG. 5, bow support (102) is in the form of an I-beam that is connected to base (503) by a pair of opposing mounts (505a-b). Also depicted in FIG. 5 is a pair of opposing hinges (504a-b) which permit bow target (103) to be adjusted such that the angle of the opposing planar portions that form bow target (103) can be arranged to accommodate watercraft having different bow shapes. As explained below under FIG. 6, the planar portions can be opened 180° to form a plane for accommodating flat bow shapes, such as on a houseboat or barge. Accordingly, the term "watercraft" includes, but is not limited to, boats having v-shaped hulls, catamarans, houseboats, barges, hovercraft and personal watercraft such as jet-skis and Seadoos®. The described system might also be adapted for use with trailers for land vehicles, for example all-terrain vehicles or trucks. The scope of use of the above described systems should therefore be interpreted broadly. rather than restrictively.

Figure 6:
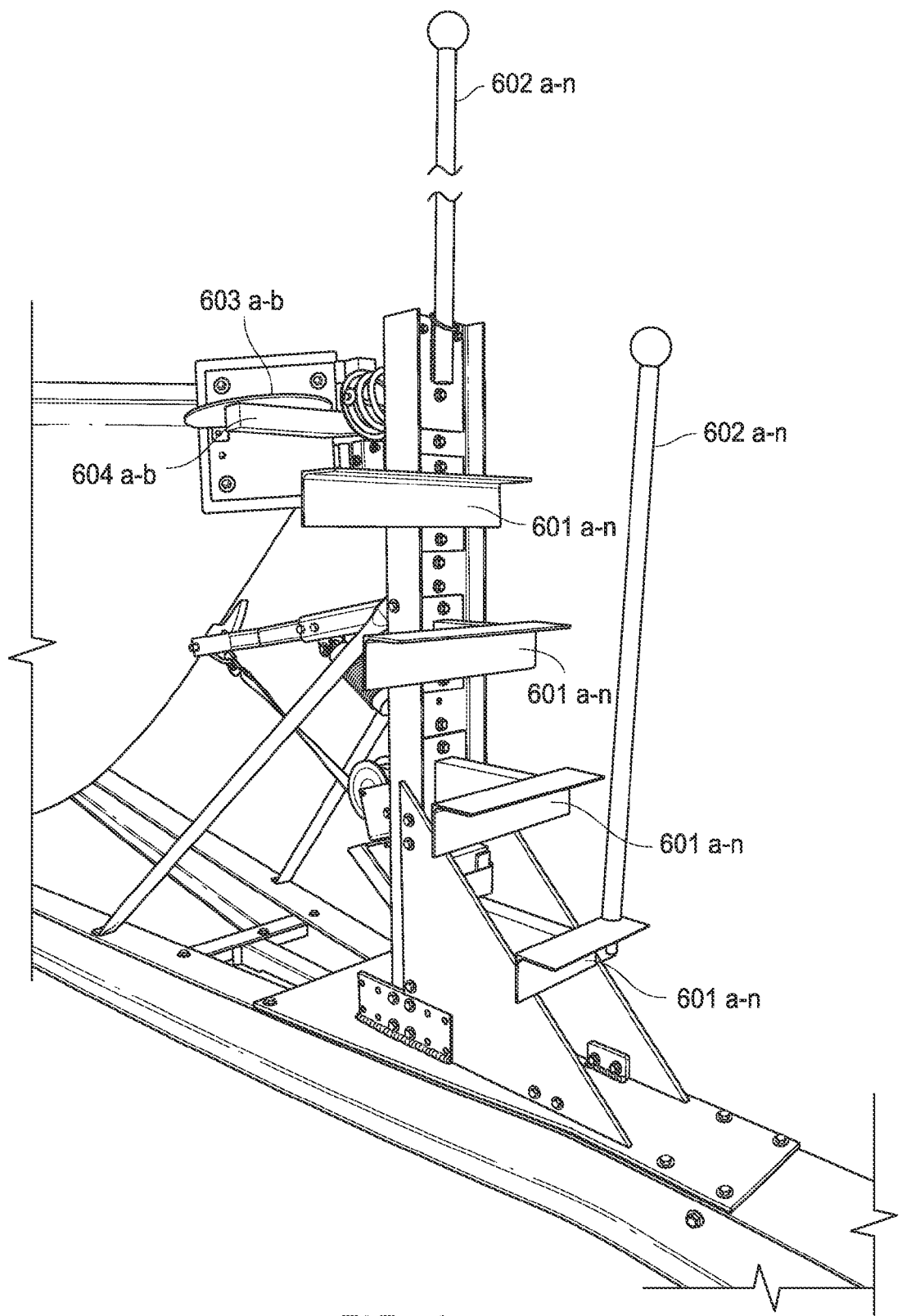
FIG. 6 is a front perspective view of the inventive system from FIG. 5.
Figure 7:
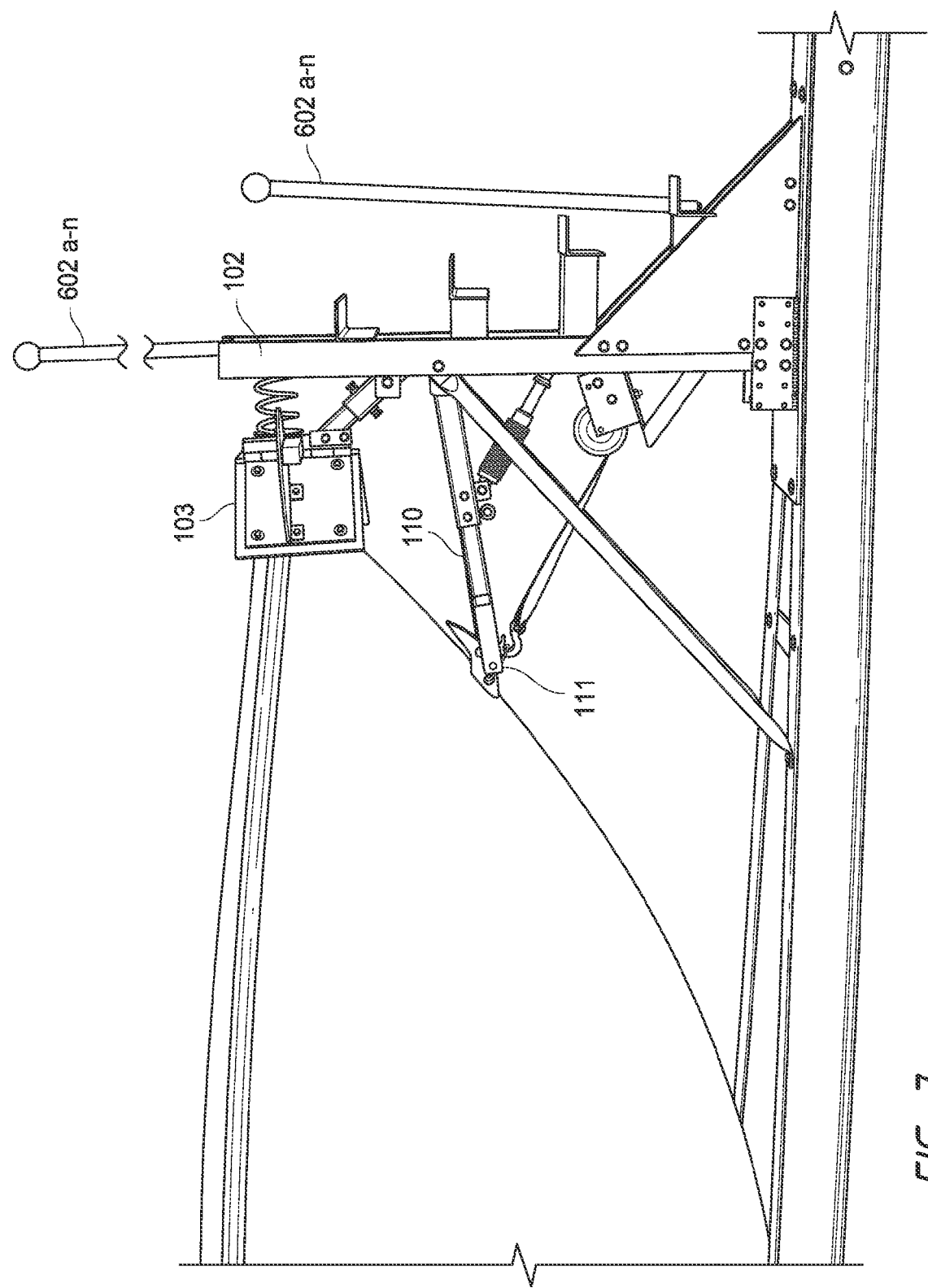
FIG. 7 is a side view of the inventive system from FIG. 5.

FIG. 6 depicts a front, side view of the trailer from FIG. 5 showing a plurality of steps 601(a-n) that are connected to bow support (102) such as by bolts or welding. Also depicted is a plurality of handles (602a-n) which may be connected to steps (601 a-n) or to bow support (102). Bow support (102) may be assembled with other accessories such as lights, storage compartments or hose racks, for example.

Also depicted in FIG. 6 is the arrangement for adjusting the configuration of bow target (103). This arrangement may comprise a pair of matching bow target adjustment plates (603a-b) which are connected to the opposing planar portions of bow target (103). Bow target adjustment plates (603a-b) are connected to opposing linear members (604a-b), such as by bolting. Linear members (604a-b) are fixed to mount (201). Adjustment of the angle of bow target (103) is accomplished by operating hinges (504a-b) to swing the opposing planar portions of bow target (103) to a desired position, and then fixing bow target adjustment plates (603a-b) to linear members (604a-b) such as by bolts that may traverse linear members (604a-b) and bow target adjustment plates (603a-b)Accordingly, bow target adjustment plates (603a-b) may be equipped with a series of holes for bolting bow target adjustment plates (603a-b) to linear members (604a-b) at a number of predetermined positions. Equipping the present system with a bow target that cooperates i.e. fits) the bow or keel of a desired watercraft are also within the scope of the invention.

Some aspects of the invention relate to methods of using the described system for connecting a watercraft to a trailer.

In such methods, a watercraft trailer comprising the inventive system is backed down a boat ramp so that the trailer is submerged at an appropriate depth such that bow target (103) is at the approximate height as the bow of watercraft (120) when watercraft (120) is floating in a body of water. Prior to backing the trailer into the water, the height of latch arm (110) above frame (101) is adjusted so that catch mechanism (111) is at approximatelyr the same height as keel hook (119). The height of latch arm (110) may be adjusted by connecting winch (118) to loop (302) and drawing latch arm (110) towards frame (101), or by threading load compression member (115) to an appropriate length. Once the trailer having the system of the invention is submerged to an appropriate depth, the operator of watercraft (120) uses bow target (103) as a visual guide for navigating watercraft (120) onto the trailer until the bow of watercraft (120) abuts bow target (103). The operator then applies sufficient thrust to enable watercraft (120) to compress toad compression member (104) such that leading edge (401) of keel hook (119) rides against catch mechanism (111) thereby compressing load compression member (115) which forces notch (402) to engage cross member (301) as watercraft (120) advances. Once in this position, the forward motion of watercraft (120) is stopped and the resistance provided by the compression of load compression member (104) holds cross-member (301) and notch (402) in an engaged position, Once in this configuration, the automatic connection between watercraft (120) and the trailer is complete and watercraft (120) and the trailer are withdrawn from the body of water.

In order to launch a watercraft from a trailer that is equipped with a system according to the invention, the operator may engage winch (118) to draw latch arm (110) down towards frame (101) until catch mechanism (111) and keel hook (119) are disengaged, With gravity securing watercraft (120) to the trailer, watercraft (120) and the trailer are backed into a body of water until the trailer is sufficiently submerged to permit watercraft (120) to float and lift away from the trailer. Watercraft (120) is then backed out away from the trailer and the trailer is withdrawn from the body of water.

Some aspects of the invention relate to equipping a trailer with the inventive system. Such methods, may be practiced, for example, by (i) providing a watercraft trailer having a frame, (ii) connecting a bow support to the forward end of said frame, (iii) connecting a bow target assembly, having a first compression member and a bow target, near the upper end of said bow support, (iv) optionally connecting said bow target to said bow support by providing a bow target guide and pivotably connecting a first end of said bow target guide to said bow target and pivotably connecting a second end of said bow target guide to said bow support, (v) pivotably connecting a latch arm to a middle portion of said bow support, (vi) pivotably connecting the middle portion of said latch arm to a first end of a second compression member, and (vii) connecting a second end of said second compression member to said bow support at a location that is below said latch arm.

As for materials, many types of materials may be used for making the system of the invention, giving due regard to corrosion, pliability and the desired strength of the various components of the invention. Aluminum may be particularly desirable, as it is lightweight, not subject to rust and is relatively easy to machine. Stainless steel is also a good choice, with its relative strength. Steel might also be advantageously used, especially if plated with nickel or other rust-inhibiting material. Yet many other metals, plastics, nylons and composites might be used, as will be understood by one of ordinary skill. For example, the portions of bow target (103) which contact the bow of a watercraft may be manufactured from nylon, wood, plastic, or other suitable material so that the bow of the watercraft can be protected from scratching.

While various systems and methods have been described and illustrated in this specification, those skilled in the art will appreciate that variations and modifications may be made without departing from the principles herein illustrated, described, and claimed. The present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

I claim:

1. A system for automatically connecting a watercraft to a trailer, said system comprising:
   a bow target configured to receive the bow of a watercraft;
   a first compression member configured to connect said bow target to a bow support on a trailer; and
   a first linear member having a proximal end and a distal end, said proximal end having a first pivoting connection point, and said distal end having a catch mechanism.
   wherein said bow target is configured to compress said first compression member upon receiving the bow of said watercraft.

2. The system of claim 1, further comprising a hook that is configured to connect to the hull of said watercraft and cooperate with said catch mechanism.

3. The system of claim 1, wherein said first linear member comprises a second pivoting connection point between said proximal end and said distal end.

4. The system of claim 3, further comprising a second compression member having a first end configured to connect to said second pivoting connection point and a second end configured to connect to a pivoting connection point on said bow support of said trailer.

5. The system of claim 1, wherein said first compression member is selected from one or more springs, pneumatic pistons, hydraulic pistons, resilient members, or a combination thereof.

6. The system of claim 4, wherein said second compression member is selected from one or more springs, pneumatic pistons, hydraulic pistons, resilient members, or a. combination thereof.

7. The system of claim 1, further comprising a second linear member having a first end that is pivotal connectable to said bow target and a second end that is configured to pivotably connect to said bow support on said trailer.

8. The system of claim 1, further comprising a mount that is configured to connect said first compression member to a bow support on said trailer.

9. The system of claim 7, wherein said first linear member and/or said second linear member are adjustable in length.

10. The system of claim 1, wherein said bow target is v-shaped.

11. The system of claim 1, further comprising one or more mounts for mounting at least one of said bow target, said first compression member and said first linear member to said trailer.

12. A watercraft trailer comprising:
   a frame;
   a. bow support connected to said frame;
   a bow target connected to said bow support by a. first compression member, said first compression member being configured to provide lateral resistance to the movement of said bow target towards said bow support upon said bow target receiving a watercraft; and a linear member pivotably connected to said bow support on one end and comprising a catch mechanism on its opposing end, said catch mechanism being configured to engage a hook on the hull of said watercraft.

13. The watercraft trailer of claim 12, further comprising a second compression member connected to said linear member and to said bow support wherein said second compression member is configured to force said catch mechanism against said hook when said watercraft strikes said bow target.

14. The watercraft trailer of claim 12, wherein said hook comprises a leading edge having a notch, and said catch mechanism comprises a cross-member that is configured to engage said notch.

15. The watercraft trailer of claim 12, further comprising a bow target adjustment member that is pivotably connected to said bow target and said bow support.

16. The watercraft trailer of claim 15, wherein said bow target adjustment member is configured to adjust the height of said bow target relative to said watercraft trailer.

17. The watercraft trailer of claim 12, wherein said first compression member comprises one or more springs, pneumatic pistons, hydraulic pistons, or a combination thereof.

18. The watercraft trailer of claim 13, wherein said second compression member comprises one or more springs, pneumatic pistons, hydraulic pistons, or a combination thereof.

19. The watercraft trailer of claim 12, wherein said linear member is adjustable in length.

20. The watercraft trailer of claim 12, wherein said bow target is v-shaped.

* * * * *